United States Patent [19]
Eustace et al.

[11] Patent Number: 5,327,368
[45] Date of Patent: Jul. 5, 1994

[54] CHUNKY BINARY MULTIPLIER AND METHOD OF OPERATION

[75] Inventors: Robert A. Eustace, Palo Alto, Calif.; Judson S. Leonard, Waban, Mass.

[73] Assignee: Digital Equipment Corporation, Maynard, Mass.

[21] Appl. No.: 84,763

[22] Filed: Jun. 28, 1993

Related U.S. Application Data

[63] Continuation of Ser. No. 917,725, Jul. 20, 1992, abandoned, which is a continuation of Ser. No. 726,627, Jun. 28, 1991, abandoned, which is a continuation of Ser. No. 370,914, Jun. 23, 1989, abandoned.

[51] Int. Cl.⁵ ............................ G06F 7/50; G06F 7/52
[52] U.S. Cl. ..................................... 364/786; 364/757
[58] Field of Search ................................. 364/786, 757

[56] References Cited

U.S. PATENT DOCUMENTS

| | | | |
|---|---|---|---|
| 3,947,671 | 3/1976 | Geng et al. | 364/786 |
| 4,228,520 | 10/1980 | Letteney et al. | 364/786 |
| 4,901,270 | 2/1990 | Galbi et al. | 364/786 |
| 4,914,617 | 4/1990 | Putrino et al. | 364/786 |

OTHER PUBLICATIONS

Weinberger, "A 32-Bit Adder Using Partitioned Memory Arrays as Universal Logic Elements" *IBM Tech. Disclosure Bulletin* vol. 14 No. 1 Jun. 1971 p. 205-207.

*Primary Examiner*—David H. Malzahn
*Attorney, Agent, or Firm*—Flehr, Hohbach, Test, Albritton & Herbert

[57] ABSTRACT

A fast binary reduction tree of the type used in high speed digital computer multiplication circuits is disclosed having chunky adders formed by sub-dividing carry propagate adders into chunks of equal bit length such that chunk addition can be initiated in parallel. In the tree, chunky adders with the same chunk size and offset can be cascaded by connecting the carry-outs of one adder to the carry-ins of another, while carry-outs from adders having different offsets can be interleaved to form new partial product terms for input to the next adder level. The chunky adder tree reduces the number of levels without significantly increasing the computation time at each level, thereby increasing the overall computational speed of the circuit.

13 Claims, 5 Drawing Sheets

CHUNKY BINARY MULTIPLIER AND METHOD OF OPERATION

This is a continuation of application Ser. No. 07/917,725 filed Jul. 20, 1992, which has been abandoned, which is a continuation of application Ser. No. 07/726,627 filed Jun. 28, 1991, now abandoned which is a continuation of Ser. No. 07/370,914 filed on Jun. 23, 1989 which has been abandoned.

BACKGROUND OF THE INVENTION

1. Field of the Invention

The present invention relates to a fast binary reduction tree for reducing the number of partial product levels associated with high speed multiplication circuits.

2. Description of Related Art

State of the art high speed multiplication circuits multiply an n bit multiplier and an m bit multiplicand by simultaneously generating n partial product terms, which are reduced to a final product by adding the partial products. Of these two sequences—the formation of partial product terms and the summation thereof—summation is the one that limits the computer computational speed. Summation is done by creating levels of summation, with all summations at a given level being done in parallel. Thus, the total delay of the multiplication is the number of levels times the delay at each level. The primary goal of the technology is to reduce the number of levels, without significantly increasing the delay at each level.

Traditionally, trees of carry save adders (CSAs) are used to sum partial products. Each m bit CSA is made up of m full adders and takes as inputs three m bit integers $A = a_{m-1}, a_{m-2}, \ldots, a_0$; $B = b_{m-1}, b_{m-2}, \ldots, b_0$; and $C = c_{m-1}, c_{m-2}, \ldots, c_0$ and produces two integer outputs $S1 = S1_{m-1}, S1_{m-2}, \ldots, s1_0$ and $S2 = s2_m, s2_{m-2}, \ldots, s2_0$. To illustrate, a four bit CSA is shown in FIG. 1 (m=4) and designated there by the general reference numeral 10. In accordance with the just-discussed characteristic organization, the four bit CSA 10 is made up of four full adders and takes three 4 bit integers $A = a_3, a_2, a_1, a_0$; $B = b_3, b_2, b_1, b_0$ and $C = C_3, C_2, C_1, C_0$ as inputs and produces as outputs the two integers $S1 = s1 = s1_3, s1_2, s1_1, s1_0$ and $S2 = s2_4, s2_3, s2_2, s2_1, s2_0$.

FIG. 2 depicts a block diagram equivalent of an arbitrary width carry save adder 10.

FIG. 3 schematically depicts an exemplary carry save adder tree 15 for six partial products. In general, such carry save adder trees reduce n partial products to 2 in $O(\log_{3/2} n)$ levels. Assuming that $P_i$ is the number of partial products to be reduced in level i of a carry save adder tree, each level of CSAs will reduce $P_i$ partial products to $P_{i+1} = 2 \times P_i/3 + (P_i \bmod 3)$ partial products using ($P_i/3$ CSAs. At the level at which the number of partial products is reduced to 2, a carry propagate adder (CPA) is used to compute the final sum. Thus, in the illustrative carry save adder tree 15, six partial products ($P_0 = 6$) are reduced to two partial products in the sequence $P_1 = 4$, $P_2 = 3$ and $P_3 = 2$ using three levels of CSAs $10_1$–$10_4$ and, at the last level, a carry propagate adder 16 is used to compute the final sum.

SUMMARY OF THE INVENTION

In one aspect, our invention relates to a chunky adder, comprising a carry propagate adder broken into chunks of equal bit size to allow chunk addition to be initiated in parallel.

In another, apparatus aspect, our invention is a binary reduction tree comprised of chunky adders wherein each chunky adder comprises equal bit length sections or chunks of a carry propagate adder and has an offset corresponding to the first breakpoint in that carry propagate adder. Chunks having different offsets are interleaved to form new terms for addition in the next successive level. Also, selected chunks of the same offset in successive levels have the carry-outs of one connected to the carry-ins of the other. As a result, the tree is adapted for reducing n partial products to two partial products in $O(\log_2 n)$ levels.

In one method aspect, our invention relates to an improved approach for implementing a binary reduction tree circuit employing interconnected levels of adder means, and includes providing a plurality of adder means comprising equal bit length sections or chunks of a carry propagate adder and having an offset corresponding to the first breakpoint in said carry propagate adder; communicating the carry-outs of selected chunks having the same given offset in a level to the carry-ins of selected chunks having the same given offset in the next level; and interleaving the carry-outs of selected chunks in a level having different offsets to form a new carry-out and communicating the new carry-out to the next level.

BRIEF DESCRIPTION OF THE DRAWINGS

The above and other aspects of our present invention are described below in conjunction with the drawings, in which.

DETAILED DESCRIPTION OF THE PREFERRED EMBODIMENT(S)

Our new design for a fast binary reduction tree is based upon a new fundamental building block which is termed a chunky adder. A chunky adder is formed by breaking the conventional carry propagate adder into c bit chunks, with the bit position of the first break being called the offset. Chunky adders are denoted $CA_{c, offset}$.

Figure 1:
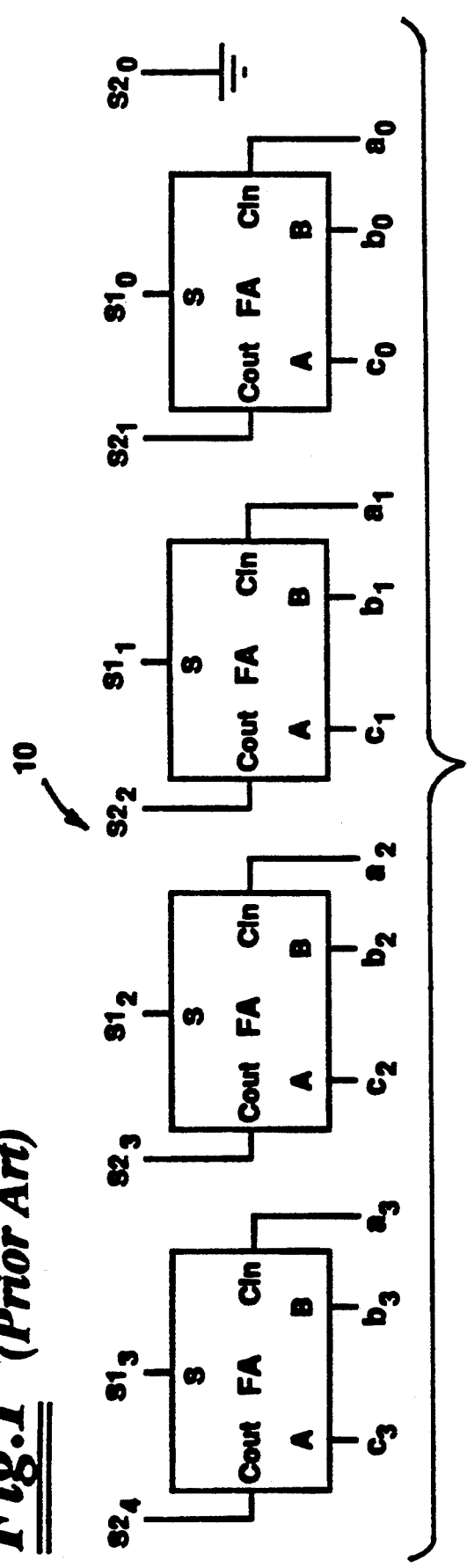
FIG. 1 schematically depicts a conventional four bit carry save adder.
Figure 2:
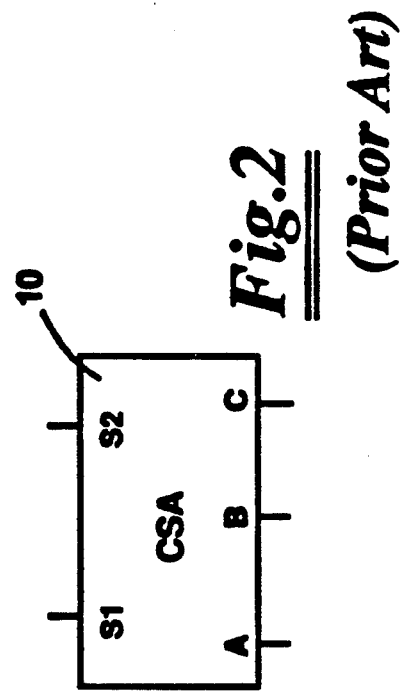
FIG. 2 is a block diagram equivalent of an arbitrary width embodiment of the carry save adder of FIG. 1.
Figure 3:
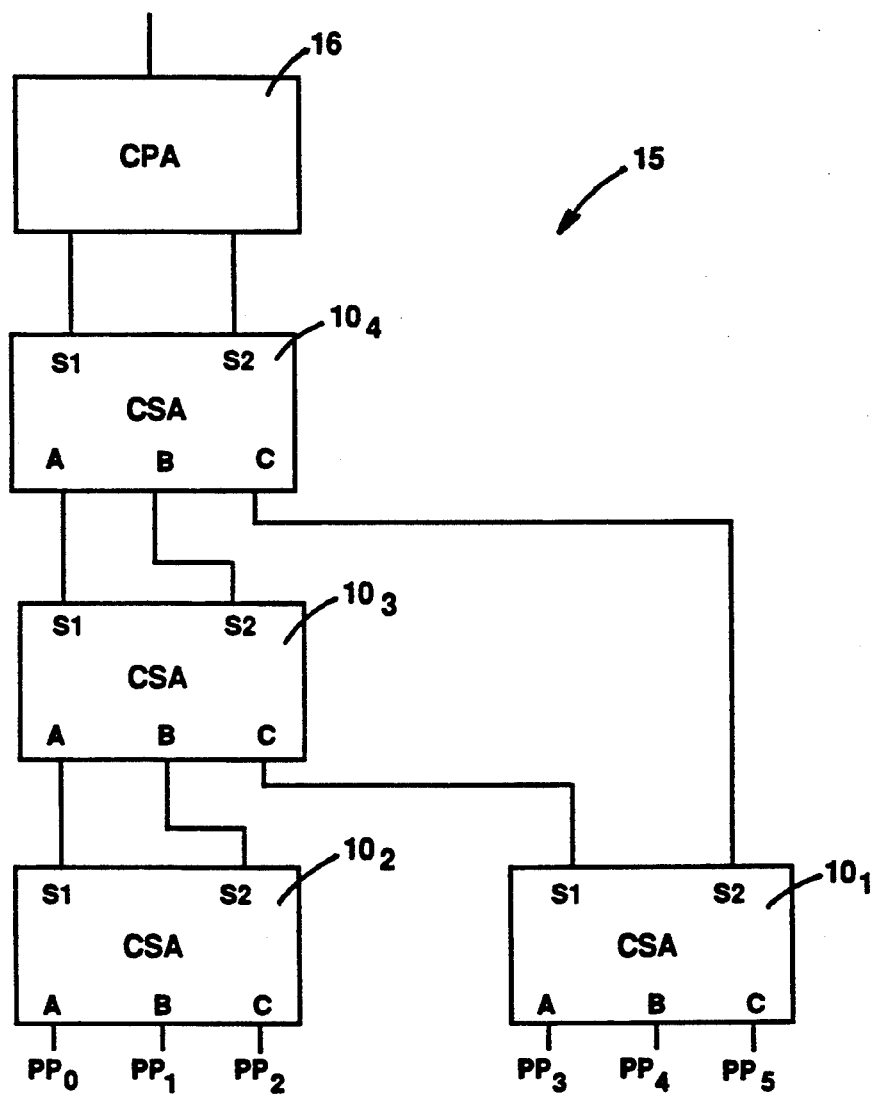
FIG. 3 schematically depicts a carry save adder tree for summing six partial products.
Figure 5:
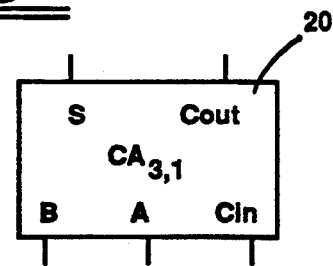
FIG. 5 is a block diagram equivalent of an arbitrary width embodiment of the chunky adder of FIG. 4.
Figure 4:
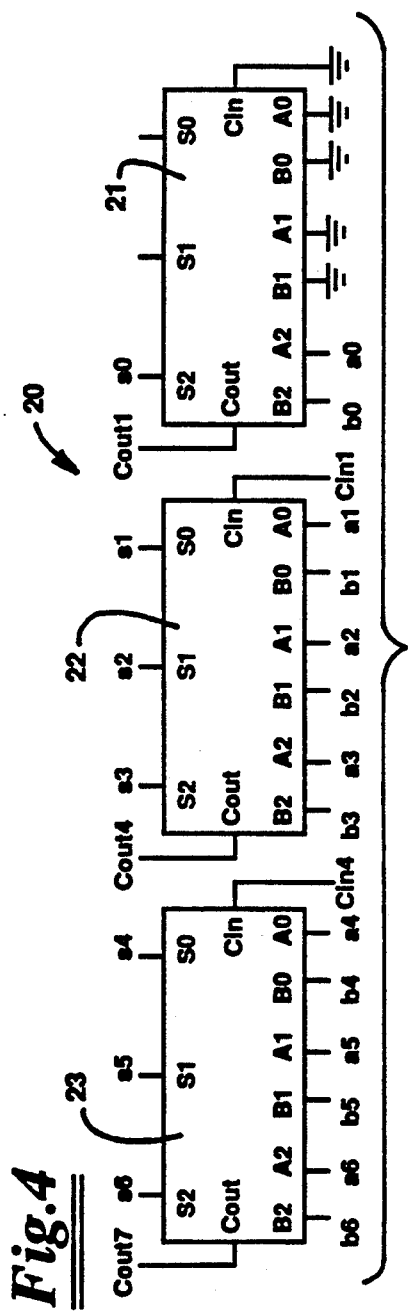
FIG. 4 schematically depicts a chunky adder designed in accordance with the present invention, comprising 3 bit chunks.

FIG. 4 schematically depicts an exemplary chunky adder 20 of the type $CA_{3,1}$, which has three chunks 21, 22 and 23, a chunk size of 3, and an offset of 1. The illustrated adder takes two inputs $A = a_6, a_5, \ldots a_0$ and $B = b_6, b_5, \ldots, b_0$ and produces the output $S = s_7, s_6, \ldots, s_0$. Carries are generated in every third bit position {1, 4, 7} and accepted in bit positions {1, 4}. FIG. 5 depicts a block diagram equivalent of an arbitrary width chunky adder $CA_{3,1}$ of the type shown in FIG. 4.

In forming a chunky binary reduction tree, the carries of chunky adders can be interconnected by cascading and interleaving.

Figure 6:
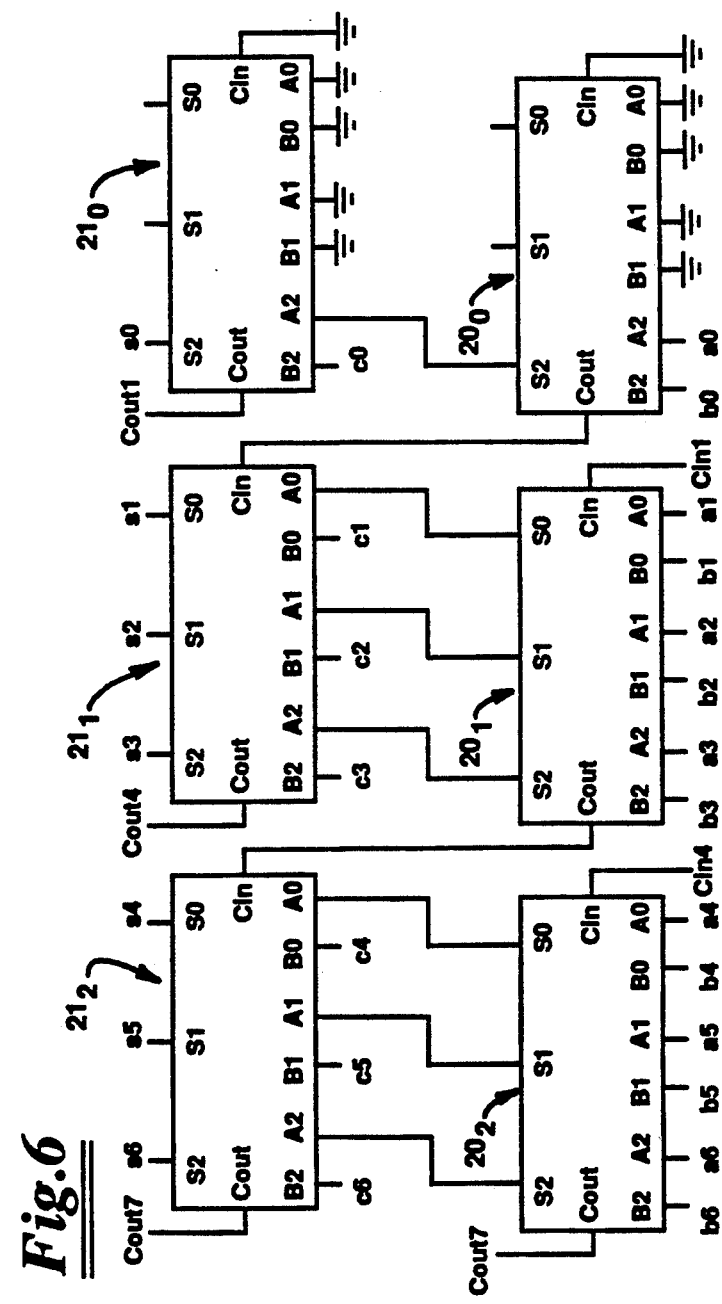
FIG. 6 schematically depicts the cascading of two chunky adders.
Figure 7:
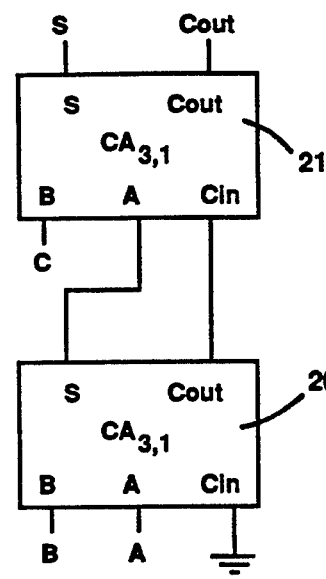
FIG. 7 depicts the block diagram equivalent of the cascaded chunky adders of FIG. 6.

Regarding cascading, two chunky adders in successive levels which have the same chunk size and offset can have their carries interconnected by connecting the carry-outs of one adder to the carry-ins of the other. For example, FIG. 6 schematically depicts a cascaded connection of two chunky adders. Carries from chunks $20_0$ and $20_1$ are connected to the carry-in of chunks $21_1$ and $21_2$, respectively. FIG. 7 depicts a block diagram which corresponds to the cascade arrangement of FIG. 6.

Two (or more) chunky adders which have the same chunk size but different offsets, can interleave carries to form new partial product terms. For example, a $CA_{3,1}$ adder generates carries every 3 bits beginning at bit position 1. A $CA_{3,0}$ adder generates carries every 3 bits beginning at bit position 0. Since these carries do not overlap, they can be combined into a single partial product. Any unused bit positions are assumed zero. Interleaving is represented in the block diagrams by a triangle. The interleaving of carries to form partial products is fundamental to the reduction process. Interleaving allows the carries from up to c chunky adders to be combined into a single product term without the use of an adder.

Chunky binary trees, thus, are formed using cascading of the carry-outs of adders which have the same offset and interleaving of the carry-outs of chunky adders which have different offsets. At the level at which the number of partial products is reduced to 3, a carry save adder is used to reduce the partial products to 2, then the resulting two partial product terms are applied to a carry propagate adder (CPA) to compute the final sum.

Figure 8:
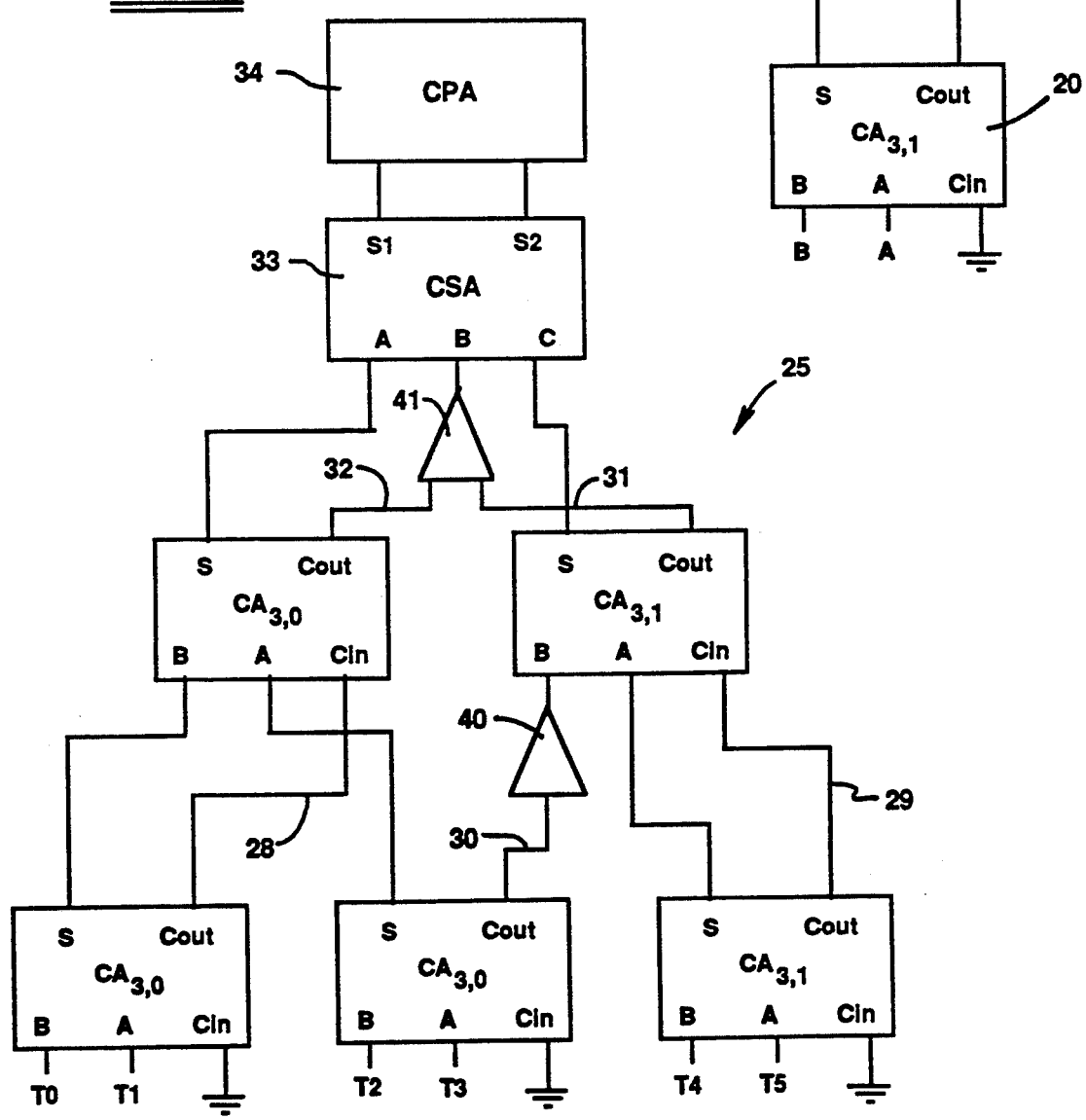
FIG. 8 schematically depicts a block diagram of a chunky adder binary tree that reduces six partial products to two using six chunky adders and one carry save adder.

FIG. 8 schematically depicts an exemplary chunky binary tree 25 which reduces six partial products to two using five chunky adders and one carry save adder. The tree uses cascaded carry interconnections 28 and 29 for carries of the same offset. Regarding carries of different offsets, carry interconnections 30 are interleaved in interconnection network 40, and carries 31 and 32 are interleaved by interconnection network 41. A CSA 33 reduces the terms from three to two and a CPA 34 implements final summation. In general, such binary trees reduce n partial products to 2 in $O(\log_2 n)$ levels. Also, each level of such chunky binary trees will reduce $P_i$ partial products to $P_{i+1} = P_i/2 + (P_i \mod 2)$ partial products using $P_i/2$ chunky adders.

In a clocked implementation with latches between each level, an estimate of the speed of the tree can be computed by multiplying the number of levels and the delay at each level. As mentioned, for the carry save adders, the number of levels is $O(\log_{3/2} n)$; the speed of each carry save adder is constant. For the chunky binay tree, the number of levels is $O(\log_2 n)$ and the delay at each level is proportional to the chunk size. Thus, if the ratio of chunky adder delay to carry save adder delay is less than the ratio of carry save adder tree levels to chunky binary tree levels, the chunky binary tree will provide faster addition than the carry save adder tree.

Figure 9:
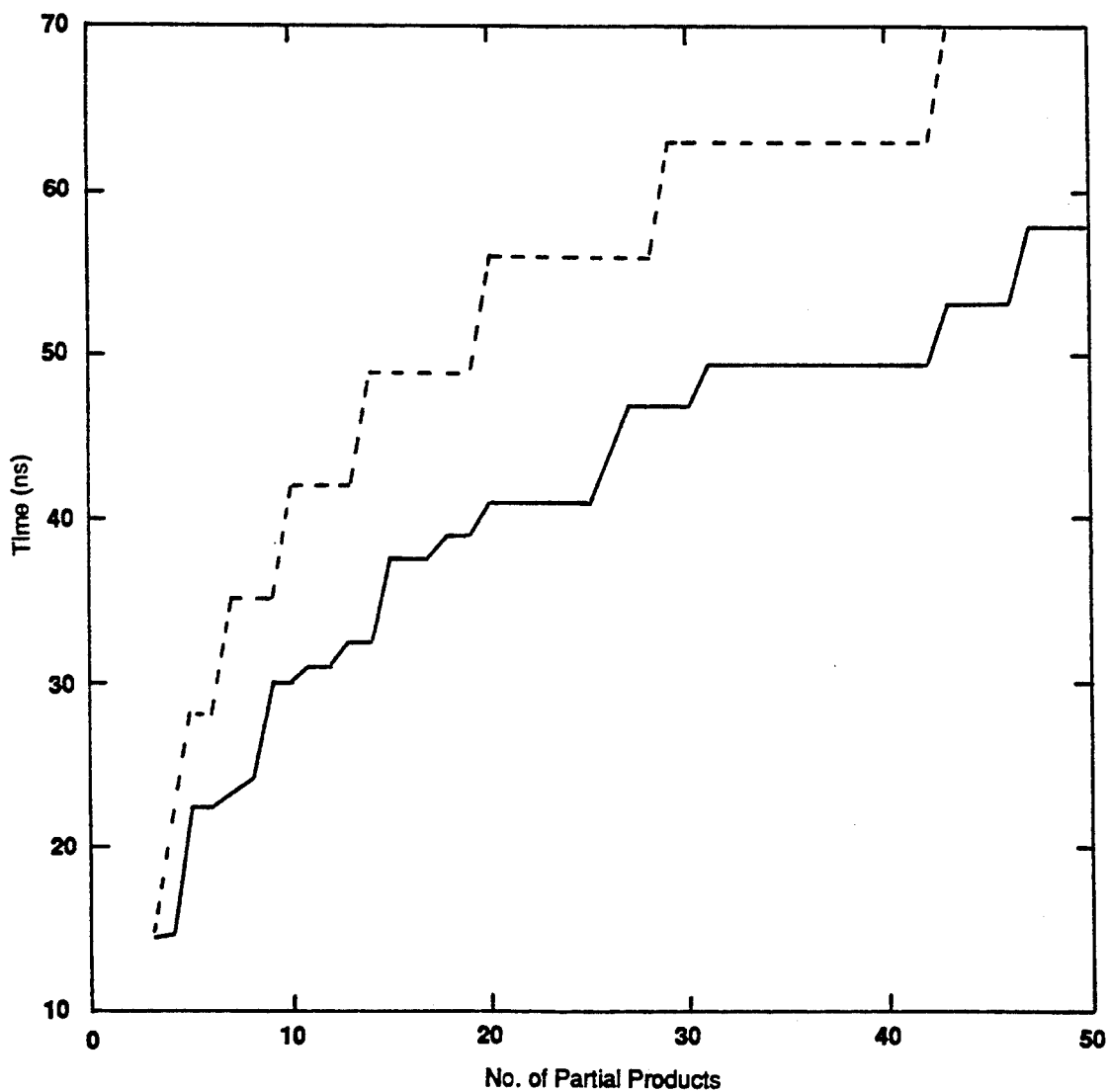
FIG. 9 is a graph of tree speed as a function of the number of terms summed, for both carry save adder trees and chunky binary adder trees.

FIG. 9 compares carry save adders tree speed (dotted line 36) to chunky binary tree (solid line 37) as a function of the number of terms that must be summed. The relative delays of the carry save adders and chunk sizes were computed using SPICE simulations on 2.0 uM CMOS II dynamic logic adders. Spare adders and extra levels were added to the chunky binary trees in those cases that reduce the overall delay through the tree. For the number of terms used in floating point multiplication (16 to 50), the chunky binary tree provided a speedup of 17 to 27 percent over the carry save adder tree.

The chunky binary tree is especially attractive when dynamic logic is used to implement fast adders. These adders require the inputs to be set up before the adder is evaluated. To maintain maximum carry save adder performance, the clocks must be very fast to match the three gate delays of the carry save adder. Chunky adders tend to more closely match system clock speeds.

While we have described the use of chunky adders in binary trees for summing partial product terms, the approach is applicable in general to the summation of mathematical terms.

Having thus described the preferred and alternative embodiments of our invention, what is claimed is:

1. An apparatus for summing partial products, said apparatus comprising:

a plurality of chunky adders, each one of said plurality of chunky adders connected to at least one other of said chunky adders, each said connected chunky adder being at a lower or higher relative level of summation relative to at least one other of said connected chunky adders;

each said level of summation including those chunky adders capable of doing a summation in parallel with each other chunky adder at said same level of summation, a chunky adder being configured at a lower relative level of summation with respect to another chunky adder configured at a higher relative level of summation when a term of the summation in the lower relative level chunky adder is needed as an input term for the other chunky adder at a higher relative level;

each said chunky adder including a carry propagate adder broken into a plurality of equal bit length chunks and having an offset corresponding to the first breakpoint in said carry propagate adder, said offset being a smaller number of bit(s) than the number of bits of said chunk bit length;

each said chunk of each said carry propagate adder of each said chunky adder generating a sum output having a plurality of output bits and a single carry-out bit in response to a first plurality of first input integers and a second plurality of second input integers and a carry-in bit; said plurality of output bits, said first plurality of first input integers, and said second plurality of second input integers being equal in number;

each said chunky adder at a lower relative level of summation being connected to communicate said sum output and said single carry-out bit from at least one of said constituent chunks to at least one of said constituent chunks of one of said chunky adders at a higher relative level of summation, and at least one of said constituent chunks of each said chunky adder at said relative higher level of summation connected to receive said sum output and said carry-out bit from at least one of said constituent chunks of one of said chunky adders at said relative lower level of summation as one of said first and said second plurality of input integers and said carry-in bit.

2. The apparatus for summing partial products of claim 1, further comprising:
means for interleaving said carry-outs from at least two chunky adders computed at lower relative levels of summation into an input term to a chunky adder at a higher relative level of summation.

3. The apparatus for summing partial products of claim 2, wherein said means for interleaving comprises connecting said carry-outs from said at least two chunky adders having different offsets at lower relative levels of summation with chunky adder carry-ins of selected chunks at a higher relative level of summation.

4. The apparatus for summing partial products of claim 1, further comprising:
means for cascading carry-outs from a chunky adder computed at lower relative levels of summation into carry-ins to a chunky adder at a higher relative level of summation.

5. The apparatus for summing partial products of claim 4, wherein said means for cascading comprises connecting carry-outs from selected chunks computed at one level of summation to carry-ins of selected chunks at a higher level of summation.

6. A fast binary reduction device for producing a final product by combining partial product terms produced by multiplying a multiplier and a multiplicand together, said device comprising:
means for receiving said partial product terms;
a plurality of adder means for combining said partial product terms, individual ones of said adder means including a carry propagate adder broken into a plurality of equal bit length chunks and having an offset corresponding to the first breakpoint in said carry propagate adder, said offset being a smaller number of bit(s) than the number of bits of said chunk bit length;
each said chunk of said carry propagate adder generating a sum output having a plurality of output bits and a single carry-out bit in response to a first plurality of first input integers and a second plurality of second input integers and a carry-in bit; said plurality of output bits, said first plurality of first input integers and said second plurality of second input integers being equal in number;
each of said carry propagate adders being connected to at least one other of said carry propagate adders, each of said connected carry propagate adders being at either a lower or a higher relative level of summation with respect to at least one other of said connected carry propagate adders;
each said level of summation including those carry propagate adders capable of doing a summation in parallel with each other carry propagate adders at said same level of summation, a carry propagate adder being at a lower relative level of summation with respect to another carry propagate adder at a higher relative level of summation when a term of the summation in the lower level carry propagate adder is needed as an input term for the other carry propagate adder at a higher level;
means for cascading carry-outs computed at lower relative levels of summation into carry-ins at a higher relative level of summation for chunks having the same offset; and
means for interleaving at least two-carry-outs computed at lower relative levels of summation into an input sum term to a chunky adder at a higher relative level of summation.

7. The fast binary reduction device as in claim 6, wherein:
each said chunk generates a sum output and a single carry-out bit in response to equal pluralities of input integers and a carry-in bit; and
said each adder means is connected to at least one other of said adder means, an adder means at a lower level of summation being connected to communicate said sum output to an adder means at a higher level of summation, and an adder means at said higher level of summation being connected to receive said sum output from said adder means at said lower level of summation as one of said plurality of inputs.

8. A method of summing terms in a binary reduction tree circuit employing interconnected summation levels of a plurality of adder means, said method comprising the steps of:
providing a plurality of adder means, each one of said plurality of adder means connected to at least one other of said adder means, each said connected adder means being at a lower or higher relative level of summation relative to said at least one other of said connected adder means;
each said adder means comprising a carry propagate adder broken into a plurality of chunks, each said chunk having equal bit size and a bit offset less than said chunk bit size and corresponding to the bit position of the first break of said carry propagate adder into said chunks;
each said level of summation including those carry propagate adders capable of doing a summation in parallel with each other carry propagate adders at said same level of summation, a carry propagate adder being at a lower relative level of summation with respect to another carry propagate adder at a higher relative level of summation when a term of the summation in the lower level carry propagate adder is needed as an input term for the other carry propagate adder at a higher level;
each said chunk generating a sum output and a single carry-out bit in response to a first plurality of first input integers and a second plurality of second input integers and a carry-in bit, said first plurality being equal in number to said second plurality;
each said adder means at a lower relative level of summation being connected to communicate said sum output and said single carry-out bit to one of said adder means t a higher relative level of summation, and each said adder means at a higher relative level of summation, and each said adder means at said relative higher level of summation connected to receive said sum output and said carry-out from one of said adder means at said relative lower level of summation as one of said first and said second plurality of input integers and said carry-in bit;
communicating the carry-outs of selected chunks in a first summation level having the same offset to the carry-ins of a selected chunk having the same offset in a second summation level; and
interleaving the carry-outs of selected chunks having different offsets in said first summation level to form a new carry-out and communicating said new carry-out to said second summation level.

9. An apparatus for summing at least three input integers, each said integer having a multi-bit bit size, said apparatus comprising:

first means for generating a first level of summation, said first means for generating comprising a first plurality of carry propagate adders of a first equal bit size and having an offset corresponding to the first breakpoint in said each of said first plurality of carry propagate adders, said first equal bit size being smaller than said multi-bit input integer bit size; and second means for generating a second level of summation, said second means for generating comprising a second plurality of carry propagate adders of a second equal bit size and having an offset corresponding to the first breakpoint in said each of said second plurality of carry propagate adder, said second equal bit size being smaller than said multi-bit input integer bit size;

each said carry propagate adder taking at least two inputs of equal bit length and a single-bit carry-in and outputting an output sum of equal bit length to said inputs and a single-bit carry-out;

said carry-outs of selected members of said first plurality of carry propagate adders being connected to said carry-ins of selected members of said second plurality of carry propagate adders that have identical bit size and offset as said selected members of said first plurality of carry propagate adders;

said carry-outs of selected carry propagate adders being connected to said carry-ins of selected different carry propagate adders that have identical bit size but different offset;

said bit size of said selected connected carry propagate adders and each said different offset being selected such that selected ones of said output sums and single-bit carry-outs from each said carry propagate adder are operatively coupled from said first plurality of carry propagate adders having said first equal bit size at said first level of summation to said second plurality of carry propagate adders having said second equal bit size at said second level of summation.

10. The apparatus for summing at least three input integers as in claim 9, wherein said first equal bit size and said second equal bit size are the same bit size for each of said carry propagate adders.

11. A multiplier, said multiplier comprising:

a plurality of chunky adders, each said chunky adder defining a level of summation;

each one of said plurality of chunky adders connected to at least one other of said chunky adders, each said connected chunky adders being at a lower or higher relative level of summation relative to said at least one other of said connected chunky adders, a chunky adder being configured at a lower relative level of summation with respect to another chunky adder configured at a higher relative level of summation when a term of the summation in the lower relative level chunky adder is needed as an input term for the other chunky adder at a higher relative level;

each said chunky adder including a carry propagate adder broken into a plurality of equal bit length chunks and having an offset corresponding to the first breakpoint in said carry propagate adder, said offset being a smaller number of bit(s) than the number of bits of said chunk bit length;

each said chunk of each said carry propagate adder of each said chunky adder generating a sum output having a plurality of outputs bits and a single carry-out bit in response to a first plurality of first input integers and a second plurality of second input integers and a carry-in bit; said plurality of output bits, said first plurality of first input integers, and said second plurality of second input integers being equal in number;

each said chunky adder at a lower relative level of summation being connected to communicate said sum output and said single carry-out bit from at least one of said constituent chunks to at least one of said constituent chunks of one of said chunky adders at a higher relative level of summation, and at least one of said constituent chunks of each said chunky adder at said relative higher level of summation connected to receive said sum output and said carry-out bit from at least one of said constituent chunks of one of said chunky adders at said relative lower level of summation as one of said first and said second plurality of input integers and said carry-in bit.

12. The multiplier of claim 11, further comprising means for interleaving carry-outs from at least two chunky adders computed at lower relative levels of summation into an input term to a chunky adder at a higher relative level of summation.

13. The multiplier of claim 11, further including means for cascading carry-outs from a chunky adder computed at lower relative levels of summation into carry-ins to a chunky adder at a higher relative level of summation for chunky adders having the same offset.

* * * * *